(12) United States Patent
O'Donncha et al.

(10) Patent No.: US 11,119,250 B2
(45) Date of Patent: Sep. 14, 2021

(54) DYNAMIC ADAPTION OF VESSEL TRAJECTORY USING MACHINE LEARNING MODELS

(71) Applicant: INTERNATIONAL BUSINESS MACHINES CORPORATION, Armonk, NY (US)

(72) Inventors: Fearghal O'Donncha, Aran Islands (IE); Emanuele Ragnoli, Dublin (IE); Callum Sutherland, Meols (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 310 days.

(21) Appl. No.: 16/247,796

(22) Filed: Jan. 15, 2019

(65) Prior Publication Data

US 2020/0225385 A1 Jul. 16, 2020

(51) Int. Cl.
*G01W 1/10* (2006.01)
*H04L 29/08* (2006.01)
*G06N 20/00* (2019.01)

(52) U.S. Cl.
CPC .............. *G01W 1/10* (2013.01); *G06N 20/00* (2019.01); *H04L 67/12* (2013.01)

(58) Field of Classification Search
CPC .......... G01W 1/10; H04L 67/12; G06N 20/00
See application file for complete search history.

(56) References Cited

U.S. PATENT DOCUMENTS

| 6,611,737 B1* | 8/2003 | El-Tahan | G05D 1/0206 701/21 |
|---|---|---|---|
| 8,626,366 B2 | 1/2014 | Noffsinger | |
| 8,654,607 B2* | 2/2014 | Strong | G01S 15/62 367/90 |
| 9,128,483 B2 | 9/2015 | Räsänen | |
| 2005/0251300 A1 | 11/2005 | Hellvik | |
| 2008/0255757 A1* | 10/2008 | Bruce | G01C 21/20 701/423 |
| 2010/0280750 A1 | 11/2010 | Chen | |
| 2014/0067249 A1 | 3/2014 | Gagliardi | |
| 2014/0114509 A1 | 4/2014 | Venables | |

FOREIGN PATENT DOCUMENTS

| CN | 103196449 A | 3/2013 |
|---|---|---|
| CN | 106184649 A | 7/2016 |
| JP | 2014013145 A | 6/2012 |
| JP | 2016060454 A | 9/2014 |

OTHER PUBLICATIONS

Tahan et al. Ship Predictor System (SPS) (Year: 2004).*

(Continued)

*Primary Examiner* — Mohammad K Islam
(74) *Attorney, Agent, or Firm* — Griffiths & Seaton PLLC

(57) ABSTRACT

Embodiments for implementing intelligent vessel trajectory planning and adapting by a processor. A trajectory of a vessel may be dynamically determined according to forecasted wave conditions using a surrogate wave model, a wave forecasting model, one or more user defined constraints, or a combination thereof.

20 Claims, 8 Drawing Sheets

(56) References Cited

OTHER PUBLICATIONS

Qi et al. Trajectory Prediction of Vessels based on Data Mining and Machine Learning (Year: 2015).*

Kraus et al. Ship classification based on trajectory data with machine-learning methods (Year: 2018).*

Vries et al. Machine learning for vessel trajectories using compression, alignments and domain knowledge (Year: 2012).*

Valsamis et al. Employing traditional machine learning algorithms for big data streams analysis: The case of object trajectory prediction (Year: 2017).*

Linde et al., Development of a ship eco-driving prototype for inland waterways (Year: 2018).*

"A Study on the Effect of Various Forecast Bias Removal Methods on the Accuracy of Ship's Weather Routeing" Brahim Mezaoui, Hisaki Nishiyama, Ruri Shoji, Hitoi Tamaru The Journal of Japan Institute of Navigation vol. 127 (2012) pp. 19-28.

"VISIR-I: small vessels—least-time nautical routes using wave forecasts" Mannarini, G., Pinardi, N., Coppini, G., Oddo, P., and Iafrati Geosci. Model Dev., 9, 1597-1625, 2016.

"Ocean State Forecast Along Ship-routes: Evaluation Using ESSO-INCOIS Real-time Ship-Mounted Wave Height Meter and Satellite Observations" R. Harikumar, N. K. Hithin, T. M. Balakrishnan Nair, P. Sirisha, B. Krishna Parasad, and C. Jeyakumar Journal of Atmospheric and Oceanic Technology 32 (11):150904105051007 Aug. 2015.

* cited by examiner

DYNAMIC ADAPTION OF VESSEL TRAJECTORY USING MACHINE LEARNING MODELS

BACKGROUND OF THE INVENTION

Field of the Invention

The present invention relates in general to computing systems, and more particularly to, various embodiments for intelligent vessel trajectory planning and adapting by a processor.

Description of the Related Art

In today's society, consumers, businesspersons, educators, and others communicate over a wide variety of mediums in real time, across great distances, and many times without boundaries or borders. With the increased usage of computing networks, such as the Internet, humans are currently inundated and overwhelmed with the amount of information available to them from various structured and unstructured sources. Due to the recent advancement of information technology and the growing popularity of the Internet, a wide variety of computer systems have been used in machine learning. Machine learning is a field of artificial intelligence that uses statistical techniques to allow computers to learn from data without being explicitly programmed.

SUMMARY OF THE INVENTION

Various embodiments for intelligent vessel trajectory planning and adapting by a processor, are provided. In one embodiment, by way of example only, a method for intelligent vessel trajectory planning and adapting, again by a processor, is provided. A trajectory of a vessel may be dynamically determined according to forecasted wave conditions using a surrogate wave model, a wave forecasting model, one or more user defined constraints, or a combination thereof.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
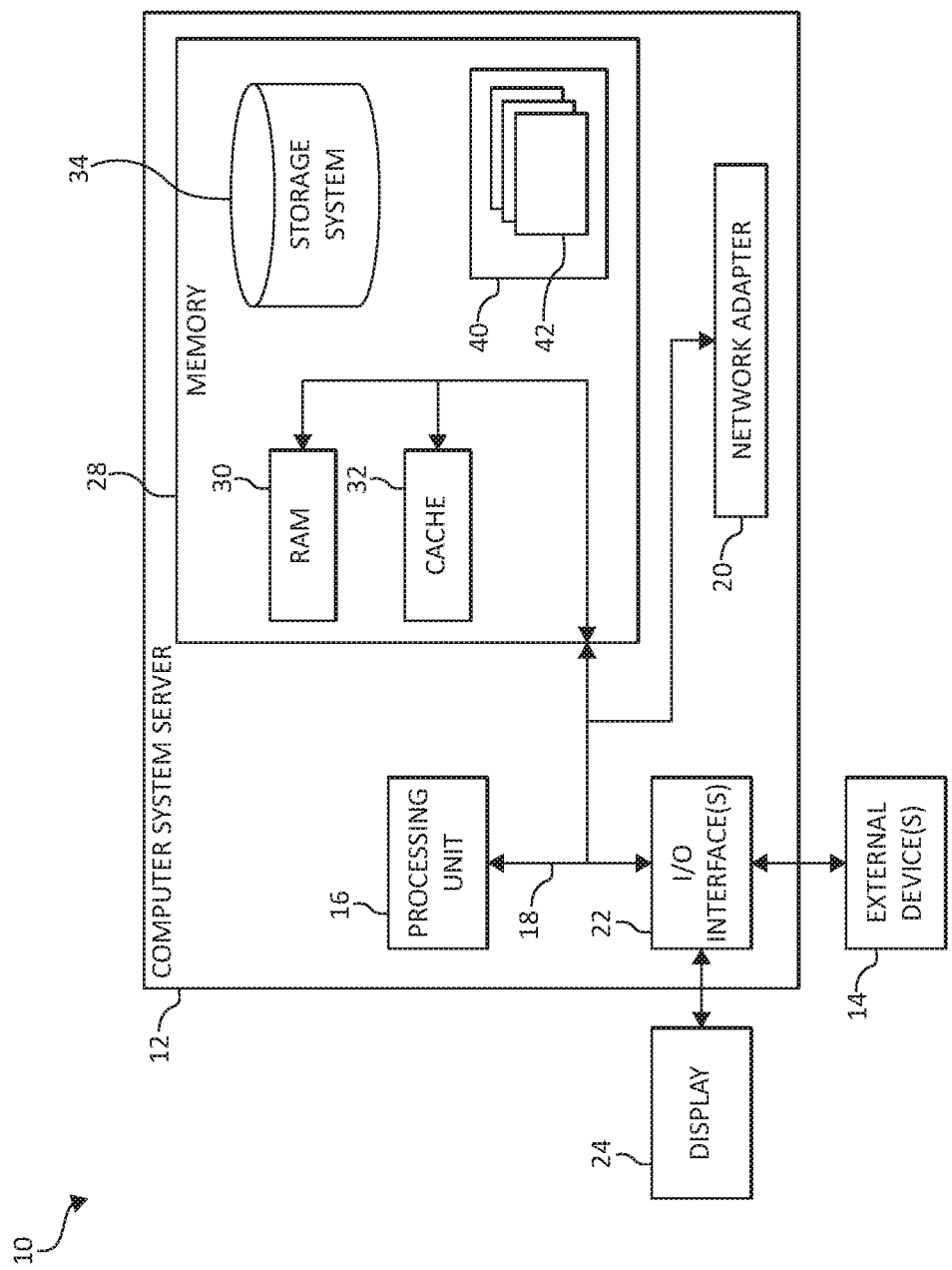
FIG. 1 is a block diagram depicting an exemplary cloud computing node according to an embodiment of the present invention.

Machine learning allows for an automated processing system (a "machine"), such as a computer system or specialized processing circuit, to develop generalizations about particular data sets and use the generalizations to solve associated problems by, for example, classifying new data. Once a machine learns generalizations from (or is trained using) known properties from the input or training data, it can apply the generalizations to future data to predict unknown properties.

In machine learning and cognitive science, neural networks are a family of statistical learning models inspired by the biological neural networks of animals, and in particular the brain. Neural networks can be used to estimate or approximate systems and functions that depend on a large number of inputs and are generally unknown. Neural networks use a class of algorithms based on a concept of inter-connected "neurons." In a typical neural network, neurons have a given activation function that operates on the inputs. By determining proper connection weights (a process also referred to as "training"), a neural network achieves efficient recognition of desired patterns, such as images and characters. Oftentimes, these neurons are grouped into "layers" in order to make connections between groups more obvious and to each computation of values. Training the neural network is a computationally intense process. For example, designing machine learning (ML) models, particularly neural networks for deep learning, typically involves millions of neurons and the model training involves learning the correct value to ascribe to these neurons in a trial-and-error process. Machine learning may be applied in a variety of applications and industries.

For example, ocean shipping is one of the most energy efficient modes of transport for the movement of goods. However, vessel emissions are set to rise with global economic growth. Through voyage optimization, a carbon footprint of a vessel can be reduced. A vessel's optimal operating profile may be determined by the vessel's size, trim, design, engine type and speed. Energy saving initiatives such as, for example, slow steaming and hull design have helped to increase efficiency and reduce operational costs, however further improvements are increasingly pushing technical boundaries.

Every vessel's voyage is subject to uncertainties and factors such as, for example, weather, tides, smooth or rough waters/seas along a shipping route that can impact the optimal operating profile and the chosen navigation path. In one aspect, ship routing determines a route for a vessel to sail that may include sailing between a starting place and a destination. Designing a safe, economic route requires consideration of a number of external factors such as, for example, water/sea state and weather. Weather is the most common reason for sailing disruption and effective forecasting of ocean/sea conditions is critical to enable efficient decision making. For example, an impending storm forecast may lead to a decision tree to either sail through the storm (incurring greater risk and potential damage), speed up to try to traverse a sailing area before the storm occurs (increasing fuel costs), slow down to let the storm pass, or even sail around the storm (incurring time delays and poor reliability). The severity of the water states (e.g., ocean, sea, lake, etc.) to be encountered during the trip is unknown apriori with certainty and must be estimated from forecasts supplied by a routing service. When sailing in rough seas, safety criteria must be met that protect the integrity of the hull and the cargo. To make the most optimal decision (e.g., maximizing sailing efficiency and minimizing safety risks), it is critical that the most accurate and recent information on current and future sea/water conditions (e.g., storm duration or severity) are available as soon as possible. Currently, these forecasts for any particular location are done by private or public institutions and then disseminated to ship operators. However, these forecasts are both slow and expensive to run and are dependent on effective means of immediately communicating these forecasts to ships in all locations, which may experience temporary interruptions and communication breakdowns causing a delay in receiving a forecast.

Accordingly, the present invention provides a cognitive system that provides intelligent vessel trajectory planning and adapting to react quickly and effectively during voyages to ensure that an optimized/best route is selected from port-to-port to minimize costs, carbon footprint and network disruption. In one aspect, a trajectory of a vessel may be dynamically determined according to forecasted wave conditions using a surrogate wave model, a wave forecasting model, one or more user defined constraints, or a combination thereof. Large scale, high resolution, high precision, forecasting models, dependent on high performance computing ("HPC") resources (e.g., computed at an HPC center and transmitted to a vessel/ship) may be integrated with one or more lightweight wave surrogate models (e.g., a wave surrogate model determined/computed locally on a vessel) to optimize ship routing in a computationally and network limited environment. The types of surrogate models vary widely, but can be classified in two broad categories, namely, response surface surrogates and lower fidelity physically based surrogates. Models in the first category directly attempt to approximate the "response surface" or "response landscape" (usually a nonlinear hyper-plane) of the original first-level model using one of many available data-driven techniques. In contrast, models in the second category are second-level physical abstractions which are cheaper to run but less accurate than the first-level model. Surrogate models may alternately be referred to as "metamodels," "model emulators," and "proxy models." A surrogate wave model may be a data-driven operation to empirically approximate the response surface of a physics-based model (e.g., a wave model) but may also be one of the other types.

In an additional aspect, the present invention provides a cognitive system that may include an internet of things ("IoT") and prediction application for optimization of ship routing operations. The cognitive system may include, for example: 1) an operational wave forecasting model (e.g., an HPC operational wave forecasting model), 2) an edge computing processing device (e.g., a ship's on-board computer system), 3) a machine learning offline component (e.g., a surrogate model) that may be trained/parameterized offline to forecast waves, 4) a machine learning online component that may include a training framework used to update a wave condition forecast (e.g., a prediction) based on availability of data from the operational wave forecasting model, 5) an optimization component to plan and/or direct a ship route based on the updated wave condition forecasts and one or more user-defined constraints (e.g., a shortest travel time, fuel costs, etc.), and/or 6) an output that may generate or output an optimal ship route based on forecasted wave conditions and the user-defined constraints.

In general, "optimize" may refer to and/or be defined as "maximize," "minimize," or attain one or more specific targets, objectives, goals, or intentions. Optimize may also refer to maximizing a benefit to a user (e.g., maximize a ship routing benefit). Optimize may also refer to making the most effective or functional use of a situation, opportunity, or resource.

Additionally, "optimize" need not refer to a best solution or result but may refer to a solution or result that "is good enough" for a particular application, for example. In some implementations, an objective is to suggest a "best" combination of shipping/travel routes, but there may be a variety of factors that may result in alternate suggestion of a combination of shipping/travel routes yielding better results. For example, an optimization problem may search for a combination of factors that result in a minimum and/or maximum combination of routes for sailing from port-to-port to minimize costs, carbon footprint and network disruption. Such factors may include particular shipping route characteristics, weather and water patterns (e.g., waves, winds, ocean/sea currents, weather patterns, etc.), ship/vessel characteristics, and/or user-defined constraints (e.g., fuel costs, energy savings, etc.). Thus, some changes to the variety of factors/parameters may result in a jump from one minimum/maximum to another minimum/maximum. In either case, resulting suggestions of a combination of shipping routes, ship/vessel characteristics, machine learning models (e.g., surrogate wave model, a wave forecasting model, etc.), and/or user-defined constraints may be considered "good enough," "substantially optimal," and/or "sufficiently good." Herein, the term "optimize" may refer to such results based on minima (or maxima, depending on what parameters are considered in the optimization problem) for suggesting of a combination of shipping routes, ship/vessel characteristics, weather and water patterns, machine learning models (e.g., surrogate wave model, a wave forecasting model, etc.), and/or user-defined constraints.

In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

It should be noted as described herein, the term "cognitive" (or "cognition") may be relating to, being, or involving conscious intellectual activity such as, for example, thinking, reasoning, or remembering, that may be performed using a machine learning. In an additional aspect, cognitive or "cognition may be the mental process of knowing, including aspects such as awareness, perception, reasoning and judgment. A machine learning system may use artificial reasoning to interpret data from one or more data sources (e.g., sensor-based devices or other computing systems) and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor-based devices or other computing systems that include audio or video devices). Cognitive may also refer to identifying patterns of behavior, leading to a "learning" of one or more events, operations, or processes. Thus, the cognitive model may, over time, develop semantic labels to apply to observed behavior and use a knowledge domain or ontology to store the learned observed behavior. In one embodiment, the system provides for progressive levels of complexity in what may be learned from the one or more events, operations, or processes.

In additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
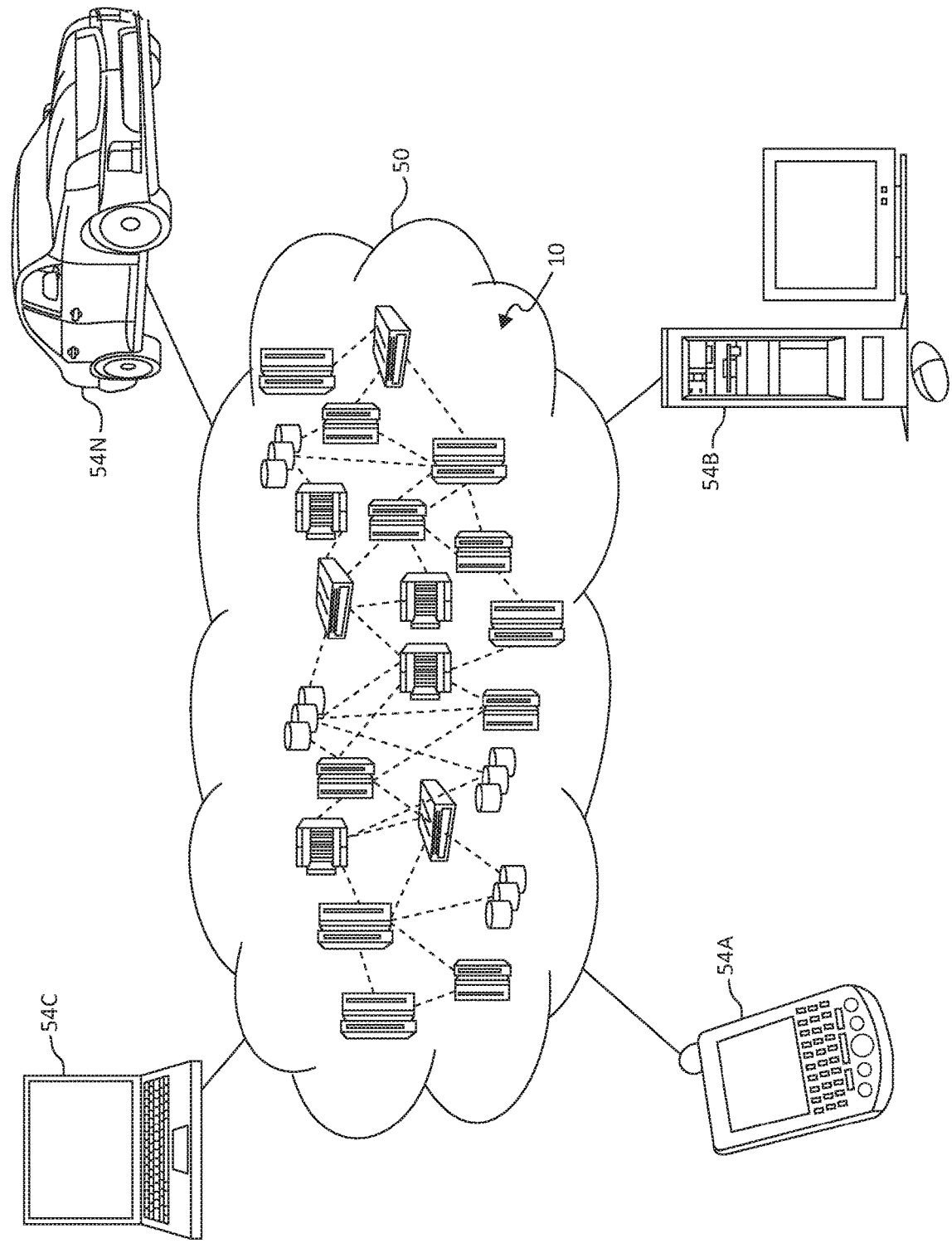
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, automobile, and/or vessel/ship computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
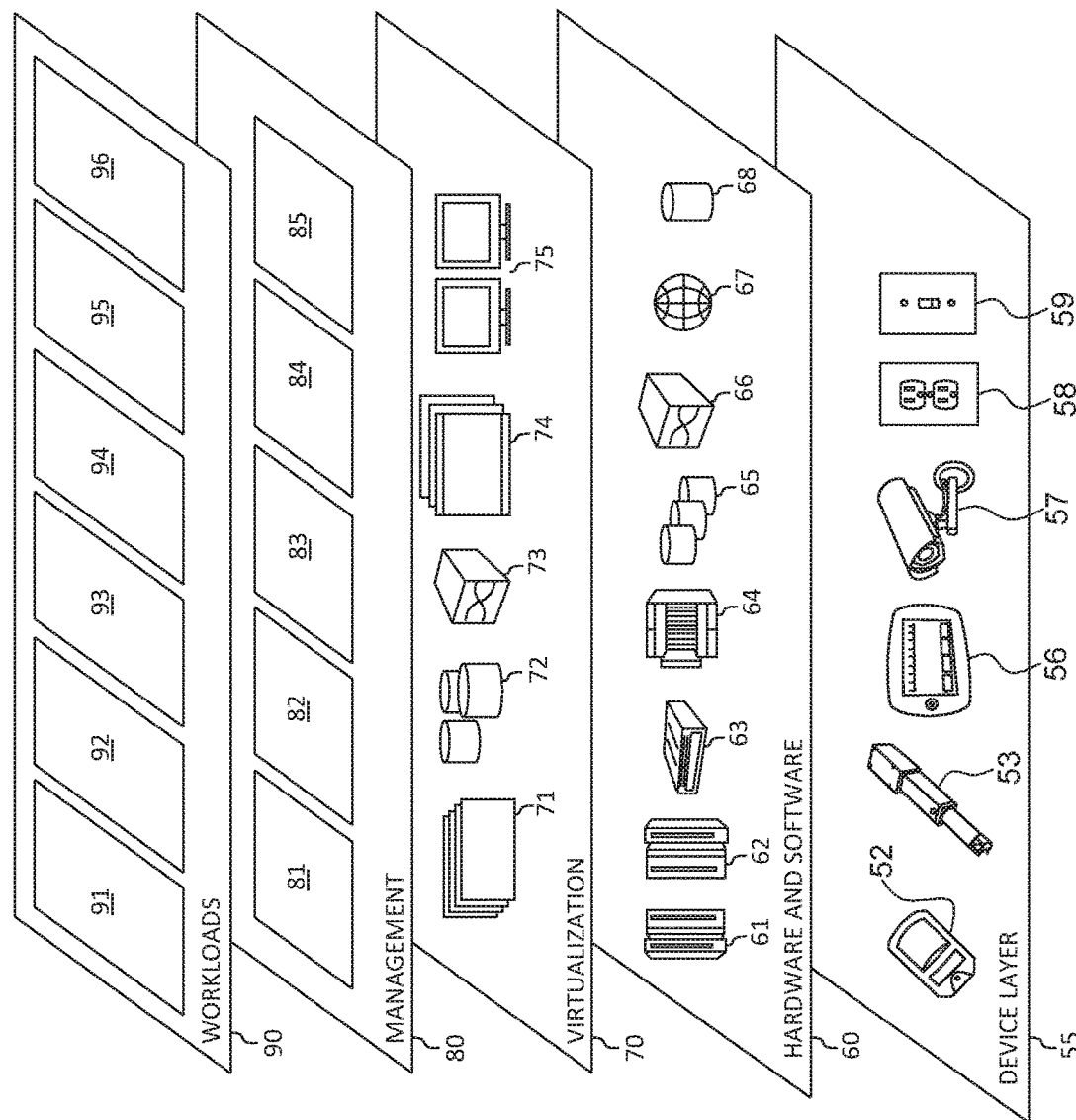
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for intelligent vessel trajectory planning and adapting. In addition, workloads and functions 96 for intelligent vessel trajectory planning and adapting may include such operations as data analytics, data analysis, and as will be further described, notification functionality. One of ordinary skill in the art will appreciate that the workloads and functions 96 for intelligent vessel trajectory planning and adapting may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the present invention provides for intelligent vessel trajectory planning and adapting. The present invention provides a computationally lightweight wave forecasting model (e.g., a surrogate wave model) that provides rapid forecasts of sea state. The present invention also uses and implements one or more highly accurate wave forecasts from operational high-resolution models when network (e.g., satellite communication) connectivity is in operation. The surrogate wave model (e.g., a neural network model trained on historical data) may be updated based on one or more available high-resolution wave forecasts (e.g., an online training module updates the parameters of the neural network with data from each received high resolution wave forecast). The present invention may access and utilize a self-contained computer system/server located on the vessel (e.g., a user equipment "UE" such as, for example, a smart phone, a tablet, smart watch, or other IoT computing device aboard a vessel).

The present invention may use a machine learning model trained on historical data, an operational wave forecasting model (e.g., national oceanic and atmospheric administration "NOAA" WaveWatch III model), an on-line training module, a ship routing optimization operation that incorporates wave conditions and user constraints (e.g., fuel costs, transit time, vessel features and characteristics, safety factors/policies. In this way, the present invention provides for increased accuracy in forecasting wave conditions by integrating high resolution forecasts (when network connection is available) with a computationally lightweight surrogate model. In this way, optimal ship routing is provided based on user constraints and frequently updated (from on-board surrogate model), highly accurate forecasts of wave conditions.

Figure 4:
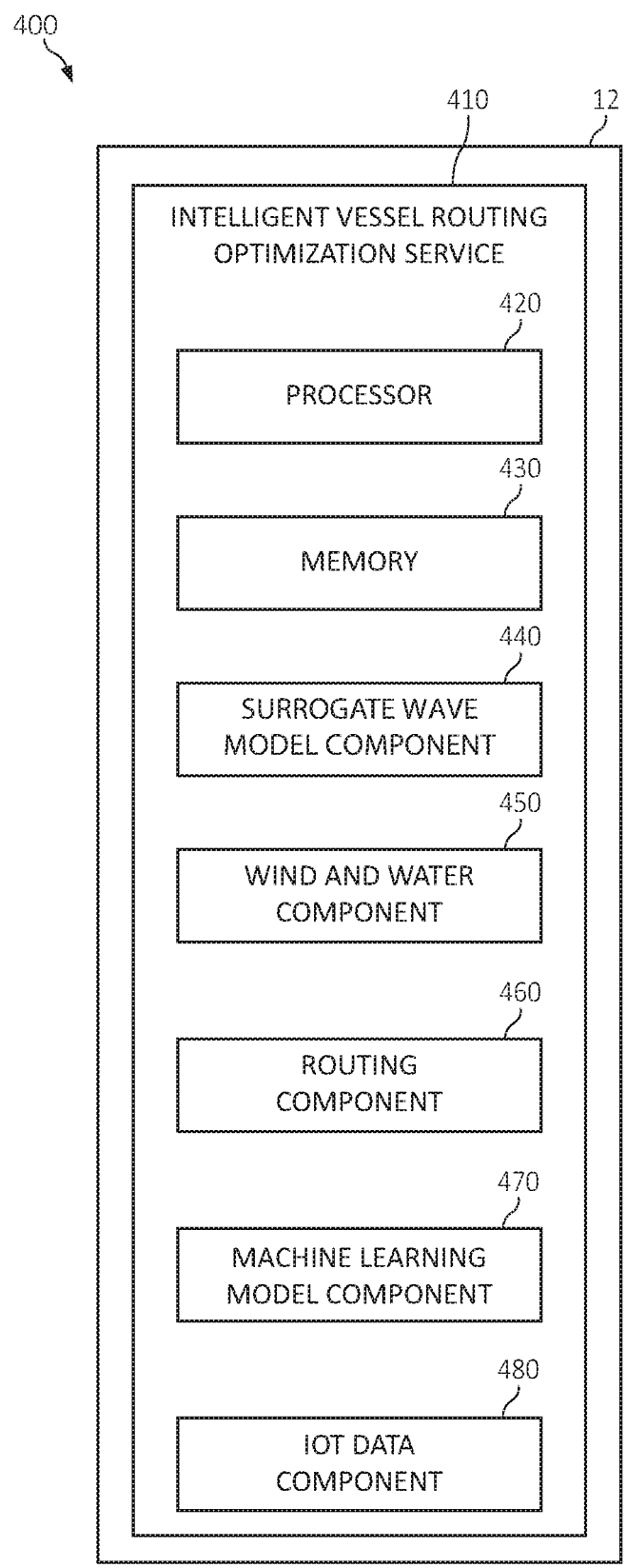
FIG. 4 is an additional block diagram depicting various user hardware and computing components functioning in accordance with aspects of the present invention.

Turning now to FIG. 4, a block diagram depicting exemplary functional components 400 according to various mechanisms of the illustrated embodiments is shown. In one aspect, one or more of the components, modules, services, applications, and/or functions described in FIGS. 1-3 may be used in FIG. 4. An intelligent vessel routing optimization service 410 is shown, incorporating processing unit ("processor") 420 to perform various computational, data processing and other functionality in accordance with various aspects of the present invention. The intelligent vessel routing optimization service 410 may be provided by the computer system/server 12 of FIG. 1. The processing unit 420 may be in communication with memory 430. The intelligent vessel routing optimization service 410 may include a surrogate wave model component 440, wind and water component 450, a routing component 460, a machine learning model component 470, and an IoT data component 480.

As one of ordinary skill in the art will appreciate, the depiction of the various functional units in intelligent vessel routing optimization service 410 is for purposes of illustration, as the functional units may be located within the intelligent vessel routing optimization service 410 or elsewhere within and/or between distributed computing components.

In one embodiment, by way of example only, the IoT data component 480 may collect data from one or more sensors, IoT devices, or a combination thereof associated with a vessel. For example, the sensors, IoT devices, or a combination thereof may be an IoT network and may include IoT devices or "smart devices," which are physical objects such as appliances with computing devices embedded therein. Examples of network-enabled appliances may include thermostats, sensor-based devices, alarms, lights, appliances, audio systems, televisions, security cameras, security sensors, heating, ventilation, and air conditioning (HVAC) zones, among countless other examples. Many of these objects are devices that may be independently operable, but they may also be paired with a control system. A vessel may also include one or more onboard sensors/IoT devices/sensor (e.g., proximity sensors, cameras, radio frequency identification "RFID" readers, biometric sensors, wearable sensors, temperature sensors, air-quality sensors, wave sensors, ocean sensors, fuel/gas sensors, etc.) associated with a vessel that may be able to measure weather conditions (e.g., temperature, moisture, air pressure, etc.), wave conditions (e.g., height, etc.), global positioning satellite ("GPS") data, energy consumptions, etc. It should be noted that weather information may include, for example, air temperature, weather patterns, wind speed/velocity, wind directions, wave velocities, wave speed directions, wave heights, current velocities and directions; and other relevant information. All data collected by the IoT data component 480 may be stored on a database or "knowledge domain" of computer system/server 12 and used for machine learning operations.

The surrogate wave model component 440, in association with a machine learning component 470, may generate a surrogate wave model forecast of wave and/or weather conditions within a selected area associated with the vessel using a surrogate wave model. The machine learning model component 470, in association with the surrogate wave model component 440, may train a machine learning model using historical data to generate the surrogate wave model. The surrogate wave model component 440 may receive an operational wave forecast model from a wave forecasting center, in communication with the intelligent vessel routing optimization service 414 located on a computing system 12 of a vessel, to assist the surrogate wave model to forecast the forecasted wave conditions. The surrogate wave model component 440 may update one or more parameters of the surrogate wave model from the wave forecasting model received from a wave forecasting center in communication with the vessel. Also, the surrogate wave model component 440 may apply the wave and wind patterns and measurements collected from the IoT data component 480 in the surrogate wave model.

In one aspect, the routing component 460 may define the one or more user defined constraints as a destination, a current route and current trajectory of the vessel, transportation costs, environmental factors and parameters, one or more parameters and features of the vessel, or a combination thereof.

As such, the routing component 460, using the data from the surrogate wave model component 440, the machine learning model component 470, the IoT data component 480, or a combination thereof may dynamically determine a trajectory of a vessel according to forecasted wave conditions using a surrogate wave model, a wave forecasting model, one or more user defined constraints, or a combination thereof. The routing component 460 may determine wave and weather patterns and measurements within a defined area associated with the vessel from data collected from the sensors, the IoT devices, or a combination thereof associated with the vessel.

The routing component 460 may dynamically update or adjust the trajectory of the vessel according to updated parameters of the surrogate wave model, one or more updated user defined constraints, or a combination thereof.

By way of example only, the machine learning component 470 may determine one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5:
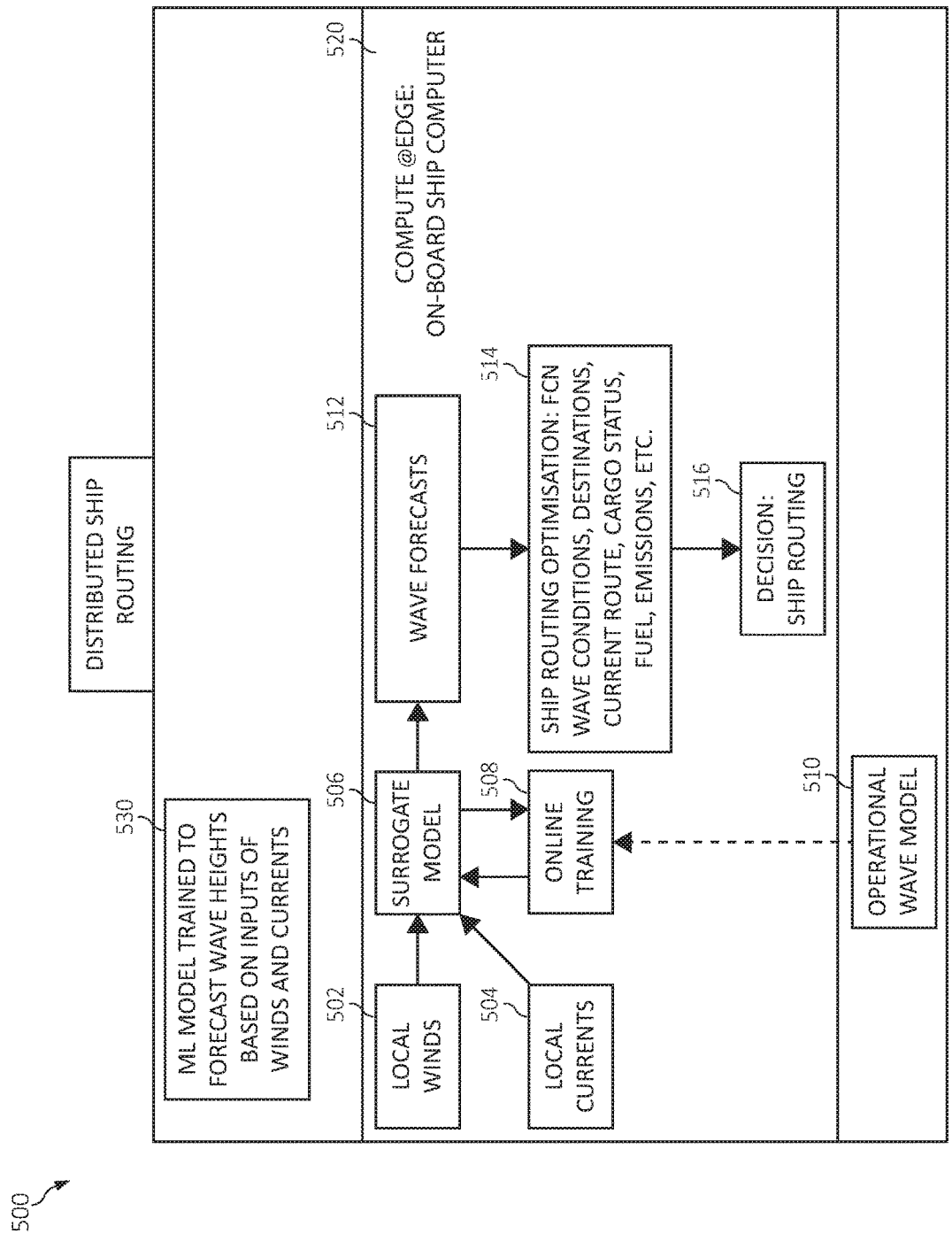
FIG. 5 is an additional block diagram depicting intelligent vessel trajectory planning and adapting in which various aspects of the present invention may be realized.

Turning now to FIG. 5, a block diagram of exemplary functionality 500 relating to intelligent vessel trajectory planning and adapting is depicted, for use in the overall context of intelligent vessel trajectory planning and adapting according to various aspects of the present invention. As shown, the various blocks of functionality are depicted with arrows designating the blocks' 500 relationships with each other and to show process flow. Additionally, descriptive information is also seen relating each of the functional blocks 500. As will be seen, many of the functional blocks may also be considered "modules" of functionality, in the same descriptive sense as has been previously described in FIGS. 1-4. With the foregoing in mind, the module blocks 500 may also be incorporated into various hardware and software components of a system for intelligent vessel trajectory planning and adapting for distributed ship routing in accordance with the present invention. Many of the functional blocks 500 may execute as background processes on various components, either in distributed computing components, or on the user device, or elsewhere, and generally unaware to the user performing generalized tasks.

Starting with blocks 502 and 504, local winds and local currents (e.g., wind conditions and water currents of an ocean within a defined distance from a vessel) may be collected from one or more sensors, IoT devices, and/or computer devices and sent to surrogate model 506.

An operational wave model 510 may be communicated to the on-board ship computer 520. The operational wave model 510 may be used by a machine learning component to perform online training, as in block 508. For the online training, a machine learning model may be initially trained offline using historical training data, which serves as the baseline or "first guess" for the surrogate wave model. When new data becomes available (e.g., received high resolution operational wave forecasting model from block 510), each of the weights on each input parameter may be recalibrated to update the surrogate model based on latest data from the operational wave model. Using the trained surrogate model, the accuracy of a machine learning wave forecasting model may achieve equal to or greater accuracy of wave forecasting as compared to only the high-resolution operational model.

The surrogate model 506 may use a machine learning ("ML") model 530 trained to forecast wave heights based on inputs of the wind and currents of block 502 and 504, which may also be provided for online training of block 508. Thus, the surrogate model 506 may provide/generate a wave forecast, as in block 512. A ship routing optimization operation may be performed that may include, but not limited to, a function ("FCN") of wave conditions, a destination, a current route, vessel features/functionality/cargo status, fuel/gas, emissions, or other defined computing function and one or more ship routes may be determined, updated, adapted, adjusted, and/or corrected according to the ship, as in block 514.

For the ship routing optimization, the control problem definition requires the maximization or the minimization of a prescribed performance objective such as, for example, a minimum amount of fuel consumption and maximum transit speed, subject to one or more constraints (e.g., speed, economic feasibility, safety, customer service objectives, etc.). Weather routing problems may be modeled as nonlinear continuous optimization problems or discrete optimization problems by discretizing space and/or time. A wide range of solving methods varying from methods in optimal control theory, and dynamic programming to Dijkstra's algorithm may be used to identify/find one or more local (e.g., within a selected region of the vessel and/or within a defined distance from the vessel) and/or global optimized routes for the vessel. Each optimized ship routing solution may include a single-objective or multi-objective optimization. For example, a multi-objective ship routing problem with three objective function may be a minimization of voyage time, fuel consumption and sailing risk. Other user-defined constraints such as, for example, status of cargo (e.g., delayed) of a vessel, destination port operations (e.g., availability of berthing facilities), and/or customer service objectives (e.g., penalties for delayed delivery) may be additionally incorporated.

One of the ship routes may selected (e.g., decision on ship route, as in block 516. That is, the optimal ship routing that is selected may be based on most recent information on operations and wave forecasts, a ship route updated at regular intervals (e.g., hourly) based on updated wave forecasts, and/or at time when a network (e.g., satellite) connection is available for receiving a high resolution wave forecasts pulled from an operational wave model and that is used to update training of surrogate model.

Figure 6:
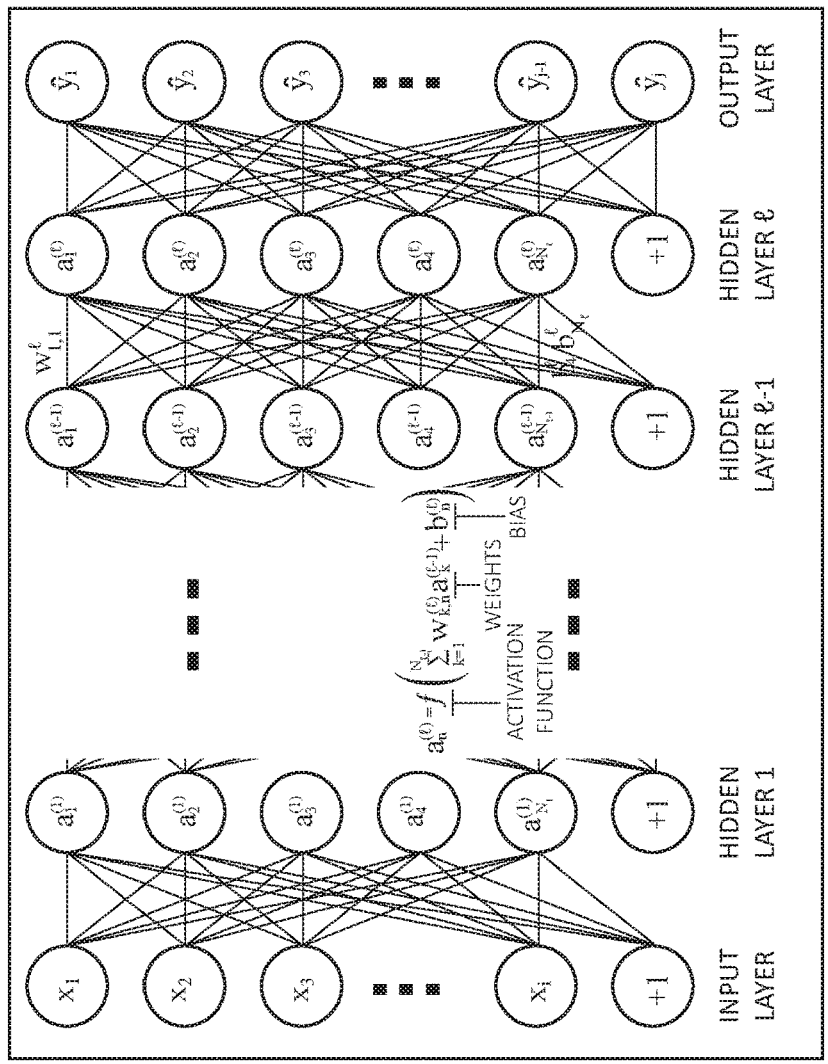
FIG. 6 is a diagram depicting an exemplary schematic of generating short-term wave forecasts using a surrogate wave model in which various aspects of the present invention may be realized.

Turning now to FIG. 6, depicting an exemplary schematic 600 of generating short-term wave forecasts using a surrogate wave model. The surrogate wave model may collect and use 1) forecasts of boundary wind and wave may be used as received from an external source (e.g., NOAA), and 2) information of a vessel's operations and desired performance. The surrogate wave model may generate a short-term wave forecasts by artificial neural network ("ANN") using multi-layer perceptron ("MLP") taking local wind and wave as predictive features. As illustrated, for generating a short-term wave forecasts, $H_s$ is a wave height (e.g., a meter), $T_p$ is a wave period (e.g., seconds) between two waves, $D_s$ is the direction of the wave (e.g., wave direction), and $U_{wind}$ is the wind speed in the east direction, $V_{wind}$ is the wind speed in the north, and U current is the ocean flow speed in the east direction, and $V_{current}$ is the ocean flow speed in the east direction. The MLP conceptual model is used to replicate Hs based on the anatomy of the brain. Such an ANN is composed of densely interconnected information-processing nodes organized into layers. The connections between nodes are assigned "weights," which determine how much a given node's output will contribute to the next node's computation. During training, where the network is presented with examples of the computation it is learning to perform, the weights are optimized until the output of the network's last layer consistently approximates the result of the training data set, which are wave heights in FIG. 6.

In one aspect, the MLP model is organized in sequential layers made up of interconnected neurons. The value of neuron n in hidden layer $\ell$ is calculated as:

$$a_n^\ell = f(\sum_{k=1}^{N_{\ell-1}} w_{k,n}^\ell a_k^{\ell-1} + b_n^\ell) \qquad (1)$$

where f is the activation function, $N_{\ell-1}$ is the number of nodes in layer $\ell-1$, $w_{k,n}^\ell$ is the weight projecting from node k in layer $\ell-1$ to node n in layer $\ell$, $a_k^{\ell-1}$ is the activation of neuron k in hidden layer $\ell-1$, and $b_n^\ell$ n is the bias added to hidden layer $\ell$ contributing to the subsequent layer.

As show in FIG. 6, the machine learning model transforms an input vector (layer) to an output layer through a number of hidden layers. The machine learning model is trained on a data set to establish the weights parameterizing the space of nonlinear functions mapping from x to y. The input layer consists of many input vectors, $x^{(m)}$, representing different conditions in time which are collated into an (m×i) design matrix, X. A corresponding (m×j) matrix, Y, is provided to the network consisting of labelled or "correct" data which enables the model to learn the mapping between the inputs and the associated correct solution in the supervised machine learning approach. A large training data set may be required to develop a robust machine learning model; an advantage of the present invention is using an accurate, but computationally expensive, simulation model to generate labelled data. Namely the simulation model is fed with each input vector, $x^{(m)}$, thereby artificially generating corresponding output, $y^{(m)}$. Hence, for each input dataset, $x^{(m)}$, a corresponding label $y^{m(m)}$ may be generated, which can be used to train the machine learning model. Model training may include computing an optimal set of model weights and biases that create the mapping between X and Y and using these model values producing a forecast ŷ. Specifically, for each layer there is a matrix, W, of size ( $N_{\ell-1}$ i+1)*$N_\ell$, comprising the optimized layer weights augmented with a column containing the biases for each layer.

To train the machine learning model, a loss function is defined in terms of the squared error between the labelled training data, y, and the machine-learning model prediction, ŷ plus a regularization contribution:

$$\vartheta = \frac{1}{2}\Sigma_{k=1}^m \|y^k - \hat{y}^k\|_2^2 + \alpha\|W\|_2^2 \qquad (2)$$

wherein the $\|\cdot\|_2$ indicates the $L_2$ norm. The regularization term on the right-hand side of the equation penalizes complex models by enforcing weight decay, which prevents the magnitude of the weight vector from growing too large because large weights can lead to overfitting to the training data. During model training the machine learning model identifies the weights and biases that minimizes the difference between the labelled data, y, and the model predictions ŷ. This is done in an iterative process that computes the optimized model weights and biases by minimizing the loss function in equation (2).

Figure 7:
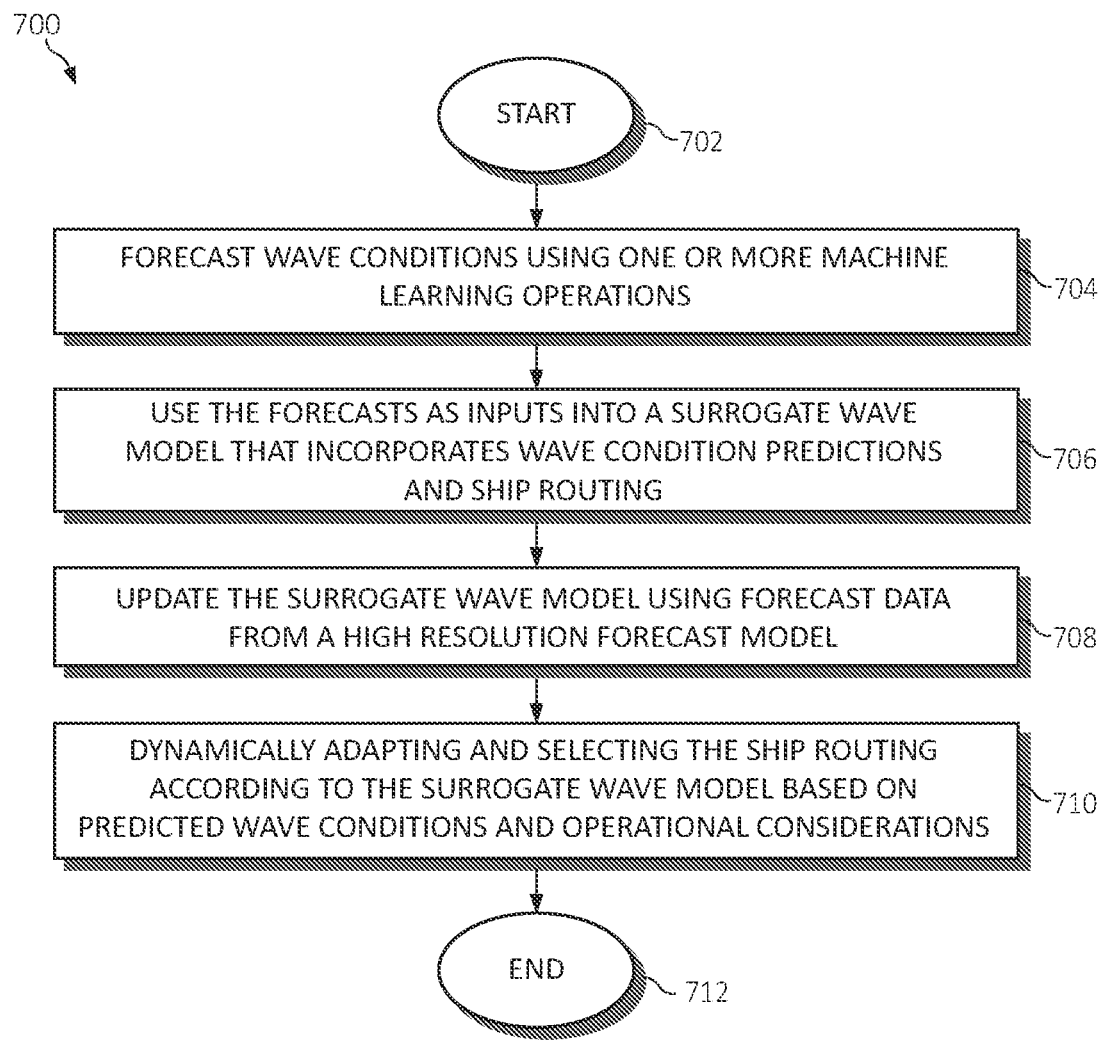
FIG. 7 is an additional flowchart diagram depicting an exemplary method for intelligent vessel trajectory planning and adapting, again in which various aspects of the present invention may be realized.

FIG. 7 is an additional flowchart diagram 700 depicting an additional exemplary method for implementing intelligent vessel trajectory planning and adapting, again in which various aspects of the present invention may be realized. The functionality 700 may be implemented as a method executed as instructions on a machine, where the instructions are included on at least one computer readable medium or one non-transitory machine-readable storage medium. The functionality 700 may start in block 702.

Wave conditions may be forecasted using one or more machine learning operations, as in block 704. The forecasts may be used as inputs into a surrogate wave model that incorporates wave condition predictions and ship routing, as in block 706. The surrogate wave model may be updated using forecast data from a high-resolution forecast model, as in block 708. A ship route may be dynamically adapted and selected according to the surrogate wave model based on predicted wave conditions and operational considerations, as in block 710. The functionality 700 may end, as in block 712.

Figure 8:
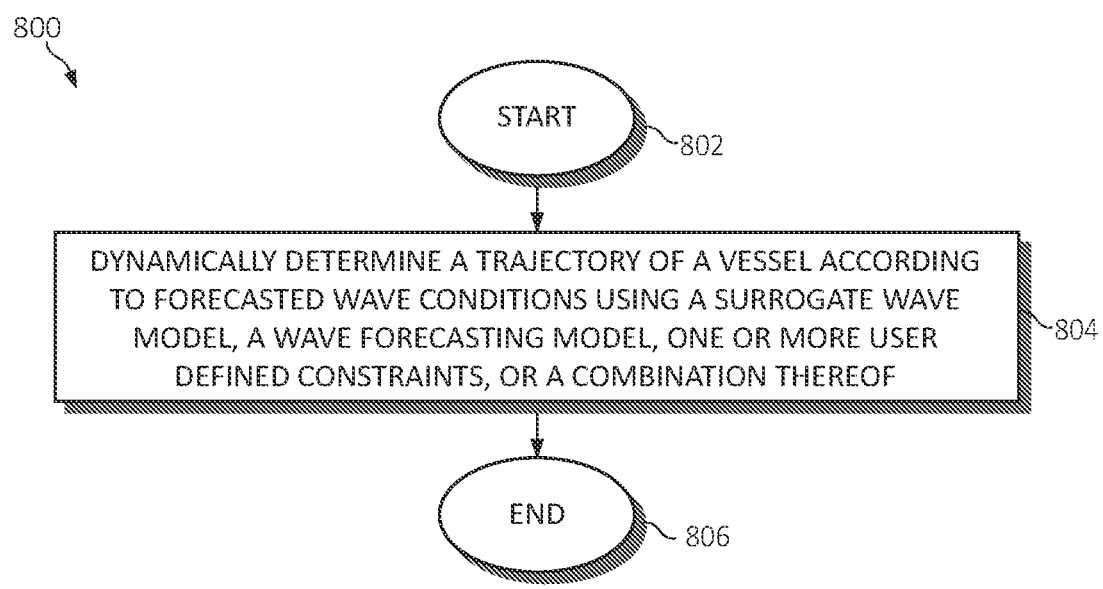
FIG. 8 is an additional flowchart diagram depicting an exemplary method for intelligent vessel trajectory planning and adapting, again in which various aspects of the present invention may be realized.

FIG. 8 is an additional flowchart diagram 800 depicting an additional exemplary method for implementing intelligent vessel trajectory planning and adapting, again in which various aspects of the present invention may be realized. The functionality 800 may be implemented as a method executed as instructions on a machine, where the instructions are included on at least one computer readable medium or one non-transitory machine-readable storage medium. The functionality 800 may start in block 802.

A trajectory of a vessel may be dynamically determined according to forecasted wave conditions using a surrogate wave model, a wave forecasting model, one or more user defined constraints, or a combination thereof, as in block 804. The functionality 800 may end, as in block 806.

In one aspect, in conjunction with and/or as part of at least one block of FIG. 8, the operations of method 800 may include each of the following. The operations of method 800 may forecast the forecasted wave conditions within a selected area associated with the vessel using the surrogate wave model.

The operations of method 800 may receive an operational wave forecast model from a wave forecasting center, in communication with the vessel, to assist the surrogate wave model to forecast the forecasted wave conditions, train a machine learning model using historical data to generate the surrogate wave model, update one or more parameters of the surrogate wave model from the wave forecasting model received from a wave forecasting center in communication with the vessel, and/or forecast the forecasted wave conditions using the surrogate wave model.

The operations of method 800 may define the one or more user defined constraints as a destination, a current route and current trajectory of the vessel, transportation costs, environmental factors and parameters, one or more parameters and features of the vessel, or a combination thereof, determine wave and weather patterns and measurements within a defined area associated with the vessel from data collected from one or more sensors, internet of things (IoT) devices, or a combination thereof associated with the vessel, and/or apply the wave and wind patterns and measurements in the surrogate wave model.

The operations of method 800 may dynamically update or adjust the trajectory of the vessel according to updated parameters of the surrogate wave model, one or more updated user defined constraints, or a combination thereof.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for intelligent vessel trajectory planning and adapting by a processor, comprising:
    generating an operational wave forecast model, wherein the operational wave forecast model is a high-resolution and high performance computing (HPC) prediction model;
    using prediction data output from the operational wave forecasting model as input to generate a surrogate wave model, wherein the surrogate wave model is selected from a response surface surrogate category or a multi-fidelity surrogate category; and
    dynamically determining a trajectory of a vessel according to forecasted wave conditions using the surrogate wave model and one or more user defined constraints.

2. The method of claim 1, further including forecasting the forecasted wave conditions within a selected area associated with the vessel using the surrogate wave model.

3. The method of claim 1, further including receiving the operational wave forecast model from a wave forecasting center, in communication with the vessel, to assist the surrogate wave model to forecast the forecasted wave conditions.

4. The method of claim 1, further including:
   training a machine learning model using historical data to generate the surrogate wave model;
   updating one or more parameters of the surrogate wave model from the wave forecasting model received from a wave forecasting center in communication with the vessel; or
   forecasting the forecasted wave conditions using the surrogate wave model.

5. The method of claim 1, further including defining the one or more user defined constraints as a destination, a current route and current trajectory of the vessel, transportation costs, environmental factors and parameters, one or more parameters and features of the vessel, or a combination thereof.

6. The method of claim 1, further including:
   determining wave and weather patterns and measurements within a defined area associated with the vessel from data collected from one or more sensors, internet of things (IoT) devices, or a combination thereof associated with the vessel; and
   applying the wave and wind patterns and measurements in the surrogate wave model.

7. The method of claim 1, further including dynamically updating or adjusting the trajectory of the vessel according to updated parameters of the surrogate wave model, one or more updated user defined constraints, or a combination thereof.

8. A system for implementing intelligent vessel trajectory planning and adaptation, comprising:
   one or more computers with executable instructions that when executed cause the system to:
      generate an operational wave forecast model, wherein the operational wave forecast model is a high-resolution and high performance computing (HPC) prediction model;
      use prediction data output from the operational wave forecasting model as input to generate a surrogate wave model, wherein the surrogate wave model is selected from a response surface surrogate category or a multi-fidelity surrogate category; and
      dynamically determine a trajectory of a vessel according to forecasted wave conditions using the surrogate wave model and one or more user defined constraints.

9. The system of claim 8, wherein the executable instructions further forecast the forecasted wave conditions within a selected area associated with the vessel using the surrogate wave model.

10. The system of claim 8, wherein the executable instructions further receive the operational wave forecast model from a wave forecasting center, in communication with the vessel, to assist the surrogate wave model to forecast the forecasted wave conditions.

11. The system of claim 8, wherein the executable instructions further:
   train a machine learning model using historical data to generate the surrogate wave model;
   update one or more parameters of the surrogate wave model from the wave forecasting model received from a wave forecasting center in communication with the vessel; or
   forecast the forecasted wave conditions using the surrogate wave model.

12. The system of claim 8, wherein the executable instructions further define the one or more user defined constraints as a destination, a current route and current trajectory of the vessel, transportation costs, environmental factors and parameters, one or more parameters and features of the vessel, or a combination thereof.

13. The system of claim 8, wherein the executable instructions further:
   determine wave and weather patterns and measurements within a defined area associated with the vessel from data collected from one or more sensors, internet of things (IoT) devices, or a combination thereof associated with the vessel; and
   apply the wave and wind patterns and measurements in the surrogate wave model.

14. The system of claim 8, wherein the executable instructions further dynamically update or adjust the trajectory of the vessel according to updated parameters of the surrogate wave model, one or more updated user defined constraints, or a combination thereof.

15. A computer program product for implementing intelligent vessel trajectory planning and adaptation by a processor, the computer program product comprising a non-transitory computer-readable storage medium having computer-readable program code portions stored therein, the computer-readable program code portions comprising:
   an executable portion that generates an operational wave forecast model, wherein the operational wave forecast model is a high-resolution and high performance computing (HPC) prediction model;
   an executable portion that uses prediction data output from the operational wave forecasting model as input to generate a surrogate wave model, wherein the surrogate wave model is selected from a response surface surrogate category or a multi-fidelity surrogate category; and
   an executable portion that dynamically determines a trajectory of a vessel according to forecasted wave conditions using the surrogate wave model and one or more user defined constraints.

16. The computer program product of claim 15, further including an executable portion that forecasts the forecasted wave conditions within a selected area associated with the vessel using the surrogate wave model.

17. The computer program product of claim 15, further including an executable portion that receives the operational wave forecast model from a wave forecasting center, in communication with the vessel, to assist the surrogate wave model to forecast the forecasted wave conditions.

18. The computer program product of claim 15, further including an executable portion that:
   train a machine learning model using historical data to generate the surrogate wave model;
   update one or more parameters of the surrogate wave model from the wave forecasting model received from a wave forecasting center in communication with the vessel;
   forecast the forecasted wave conditions using the surrogate wave model; or
   dynamically updates or adjusts the trajectory of the vessel according to updated parameters of the surrogate wave model, one or more updated user defined constraints, or a combination thereof.

19. The computer program product of claim 15, further including an executable portion that define the one or more user defined constraints as a destination, a current route and current trajectory of the vessel, transportation costs, environmental factors and parameters, one or more parameters and features of the vessel, or a combination thereof.

20. The computer program product of claim 15, further including an executable portion that:
- determine wave and weather patterns and measurements within a defined area associated with the vessel from data collected from one or more sensors, internet of things (IoT) devices, or a combination thereof associated with the vessel; and
- apply the wave and wind patterns and measurements in the surrogate wave model.

* * * * *